United States Patent [19]
Benit et al.

[11] Patent Number: 6,050,513
[45] Date of Patent: Apr. 18, 2000

[54] REEL WITH ONE PIECE GEARBOX SHELL

[75] Inventors: Bradley J. Benit; James T. Rumbaugh, both of Spirit Lake, Iowa; Bengt-Åke Henriksson, Svangsta; Lars-Olof Carlsson, Asarum, both of Sweden

[73] Assignee: Berkley Inc., Spirit Lake, Iowa

[21] Appl. No.: 08/932,658

[22] Filed: Sep. 18, 1997

[51] Int. Cl.[7] ................................................. A01K 89/01
[52] U.S. Cl. ............................................................ 242/311
[58] Field of Search ..................................... 242/310, 311, 242/312, 314, 315, 316, 241, 242, 227, 228; 74/606 R, 425; 29/434, 527.6; D22/141

[56] References Cited

U.S. PATENT DOCUMENTS

| | | |
|---|---|---|
| D. 398,700 | 9/1998 | Henriksson et al. . |
| D. 401,663 | 11/1998 | Henriksson et al. . |
| D. 401,664 | 11/1998 | Henriksson et al. . |
| 2,854,200 | 9/1958 | Montgomery . |
| 3,381,914 | 5/1968 | Taggart . |
| 3,794,264 | 2/1974 | Hull . |
| 3,836,092 | 9/1974 | Hull . |
| 4,011,774 | 3/1977 | Moosberg . |
| 4,416,428 | 11/1983 | Noda . |
| 4,618,107 | 10/1986 | Nakajima . |
| 4,811,916 | 3/1989 | Yeh . |
| 4,830,307 | 5/1989 | Lassi et al. . |
| 4,892,267 | 1/1990 | Webb . |
| 4,927,094 | 5/1990 | Henriksson . |
| 5,232,181 | 8/1993 | Fujine . |
| 5,350,130 | 9/1994 | Hitomi et al. . |
| 5,431,355 | 7/1995 | Takahashi . |

FOREIGN PATENT DOCUMENTS

| 1006058 | 4/1952 | France | ................................... 242/241 |

*Primary Examiner*—Donald P. Walsh
*Assistant Examiner*—William A. Rivera

[57] ABSTRACT

A modular spinning reel is made with a modular gearbox that includes a one piece gearbox shell that encloses a drive gear within. The modular gearbox permits components subject to wear and damage to be readily replaced without disassembling the precision gears while also providing a drive component that can be manufactured in quantity with high precision.

18 Claims, 4 Drawing Sheets

REEL WITH ONE PIECE GEARBOX SHELL

FIELD OF THE INVENTION

The invention relates generally to a spinning reel in which the cranking mechanism is based on a discrete and self-contained modular gearbox subassembly of precise machining that uses a one piece gearbox shell. Such a modular design facilitates design, reduces the cost of manufacture, and allows the use of high precision gearing mechanisms at low cost.

BACKGROUND OF THE INVENTION

The quality of the gearing in a spinning reel often is readily appreciated by an angler. High quality gearing provides the angler with a smooth, tight feel when the handle is rotated. There is little or no play in such a gear mechanism that would affect the angler's ability to exert precise control over the action of the bait. Precise gear mechanisms also provide a longer useful service life before repair. Precision gearing is highly desirable in a spinning reel.

Unfortunately, precision gear mechanisms (i.e., tolerances of less than 0.0005 inches) tend to be found only in the more expensive reels. The reasons for the increased price are numerous, but mainly because conventional spinning reels use internal surfaces, screws, and pins on each die cast housing plate to support the gearing mechanisms. Each of these parts is, itself, made with a certain tolerance. When combined into a final assembly, those individual part tolerances accumulate. Such a cumulative effect works as a limitation on the process of making precision spinning reel gear mechanisms.

Moreover, any change in the external shape of the housing entails changes in the positions of the housing openings and the layout of the guiding surfaces used for the internal gears. New guide surfaces must be designed and positioned within the housing by a relatively low skill work force so that gears can be mounted inside the housing and operated. This process occurs for each new reel model. Also, because the reel foot is integral with one of the housing side plates in conventional spinning reels, wear or damage to the reel foot often requires that the entire reel be replaced.

The intimate relationship between the gears and the housing means that the critical gearbox support surfaces must be disassembled for lubrication and reassembled by the angler under uncertain circumstances. This may introduce alignment problems that compromise the gear mechanism.

It would be desirable to have a way to provide a high precision spinning reel gearing mechanism in spinning reels that offered and maintained a high level of precision for the life of the reel. It would be a further benefit to have a spinning reel gear mechanism that could accommodate changes to the external reel housing without re-designing the entire reel in order to make such changes, could separate the utility of the reel from the wear associated with the reel foot, or did not require disassembly of critical gear support surfaces for maintenance.

In addition, the unique nature of spinning reel design (including the housing and gearbox) often means that economies of scale may be difficult to realize in the manufacture of any one model of reel. Conventional manufacturing practice often means that production of one part in large quantity has a lower per unit cost than production of the same part in a lesser quantity. This means that reels with uniquely designed housings and gearboxes may not be able to be manufactured in sufficient quantities to realize maximized economies of scale with an associated lowered unit cost of manufacture.

It would be desirable to have a way to maximize manufacturing efficiency and lower per unit costs in the manufacture of spinning reels. Such lowered costs would permit the use of higher quality gearboxes without overall change in the manufacturing cost for the reel.

SUMMARY OF THE INVENTION

A spinning reel according to the invention includes:
- a one piece gearbox with a handle shaft extending therefrom,
- a reel foot attached to said gearbox, and
- a drive shaft rotatably extending axially from said gearbox and in communication with a bail arm assembly and a spool.

The gearbox subassembly provides spinning reel manufacturers with new options for design of the housing while providing a high precision gearbox that can be machined in quantity at low tolerances. Manufacturing inventories are easier to control while economies of scale can be realized by large production of a key mechanical component.

DETAILED DESCRIPTION

Figure 1:
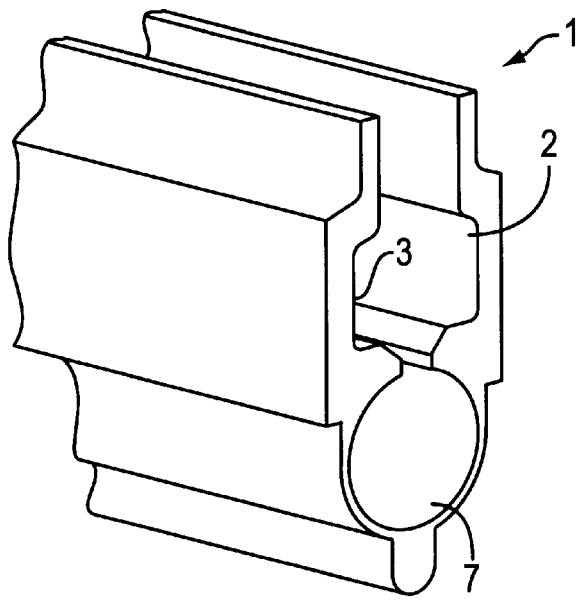
FIG. 1 shows an uncut gearbox extrudate.
Figure 2:
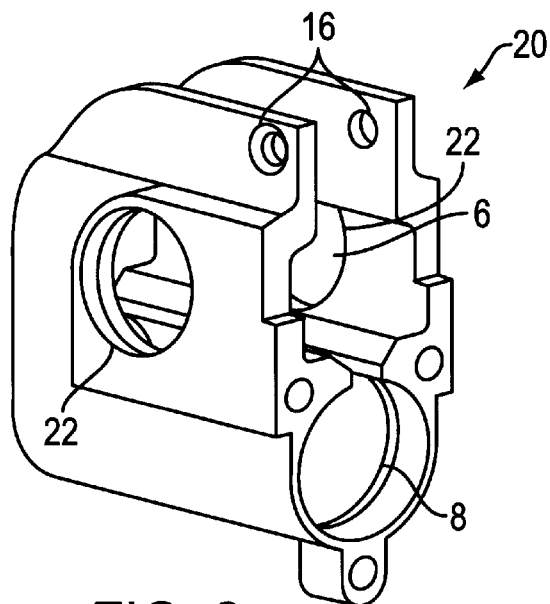
FIG. 2 shows a gearbox shell after cutting and machining the extrudate.
Figure 3:
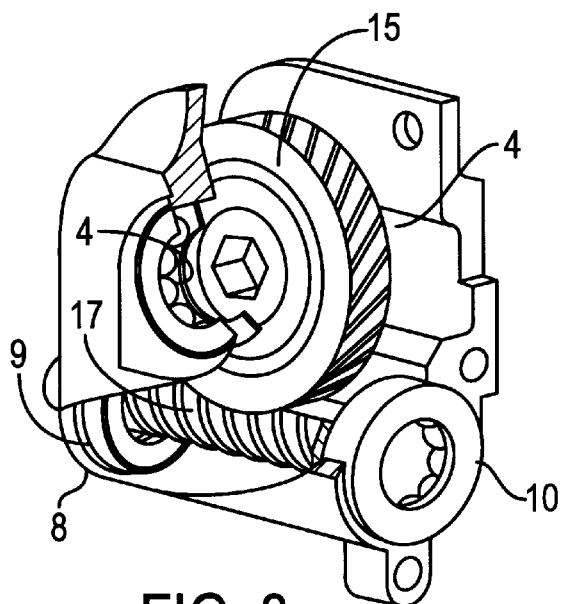
FIG. 3 is a partial section view illustrates the gear components positioned inside the gearbox shell
Figure 4:
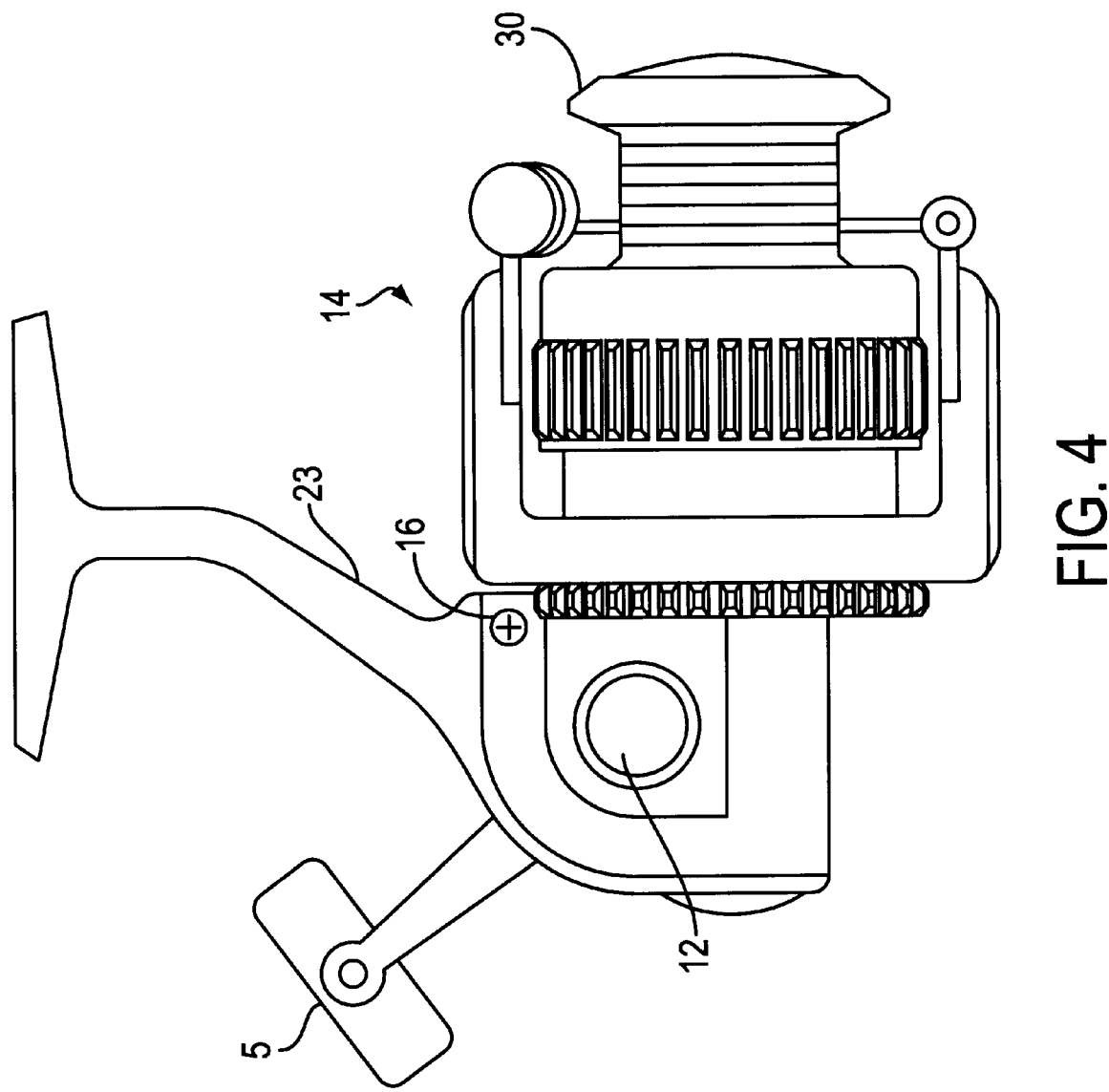
FIG. 4 is an outside view of a spinning reel according to the invention.
Figure 5:
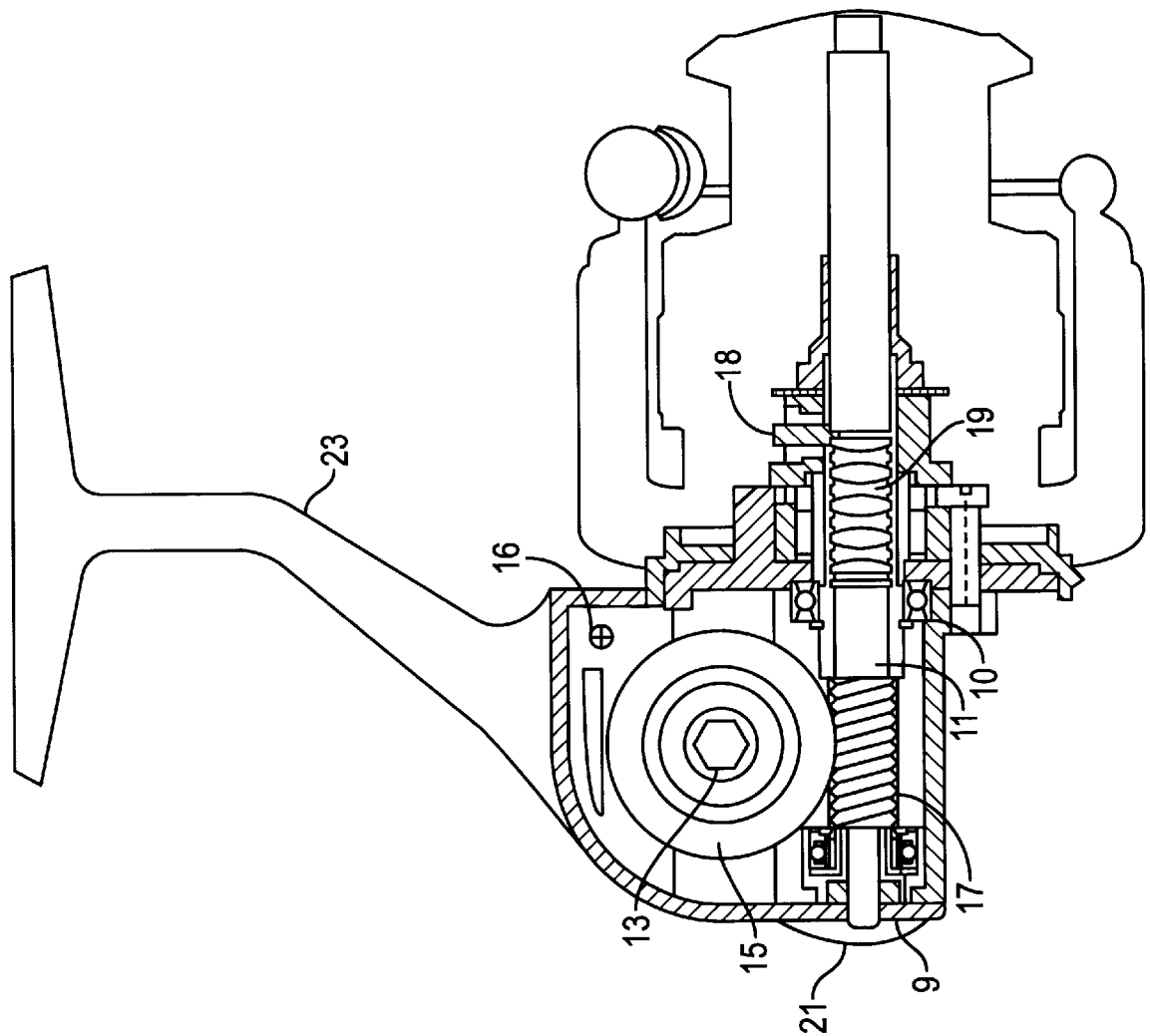
FIG. 5 is a cutaway view of the reel in FIG. 4.
Figure 6:
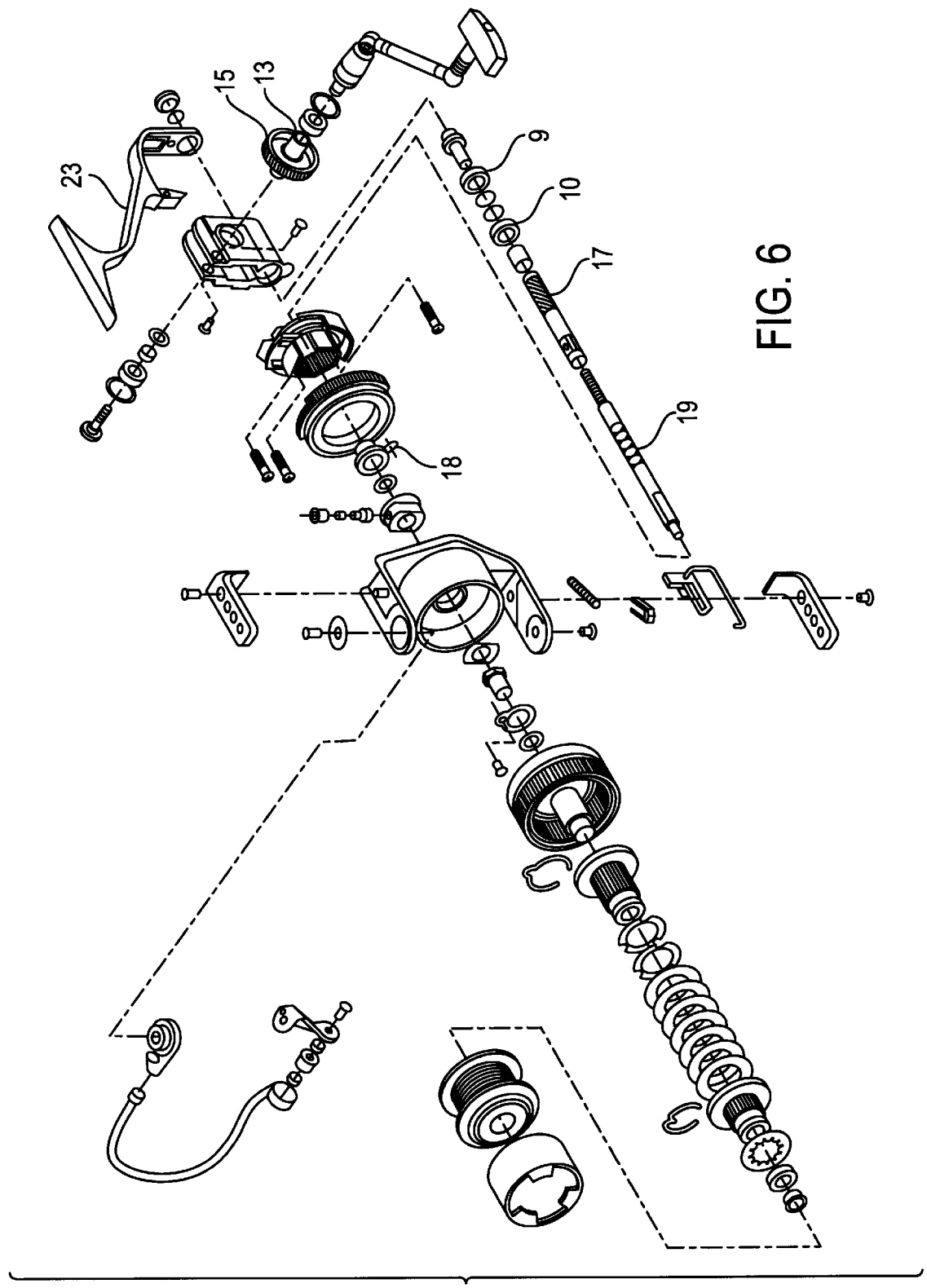
FIG. 6 is an exploded parts view of the invention.

Spinning reels according to the invention employ a modular, self-contained, one piece gearbox to which the remaining components of a spinning reel are attached, e.g., reel foot, drive shaft, rotor and bail arm assembly, drag system, etc. The modular gearbox allows a gear assembly of high precision and low tolerance to be made in quantity for realizing economies of scale. The former limitations on reel performance associated with tolerance accumulation are avoided.

The gearbox shell is preferably made into a spinning reel gearbox shell from a single piece of virtually any machinable or formable material. Suitable materials include many different types of metal (e.g., aluminum, brass, and titanium) and alloys thereof synthetic polymeric materials (thermoset polymers like epoxy composite, and thermoplastic polymers like a nylon or polyolefin) either with or without added reinforcing agents, ceramics (e.g., alumina, silicon nitride, and mullite) with or without reinforcing agents added thereto (e.g., silicon carbide as whiskers or particles, zirconia, hafnia, and boride). The preferred material is, however, aluminum 6061-T6 having a tensile strength of about 45 kpsi. This is stronger than a typical die cast aluminum, e.g., A380.0 which has a tensile strength of 24 kpsi.

The one piece gearbox used in the invention can be formed by any number of methods applicable for the material that allows a gearbox shell to be formed as a machinable blank or directly into near net final shape. Suitable methods include injection molding, die casting, cold forging, hot forging, compression molding of thermosets and thermoplastics, extruding as solid billets and machining, investment casting, sand casting, and slip casting. The preferred method is precision machining an extruded channel to include suitable internal and external surface features to serve as the gearbox shell.

The extrusion process is particularly preferred for making the gearbox shell for a number of reasons. The most important is the high degree of precision attained with extrusion so the gearbox shell can be made in quantity with tolerances of less than 0.0005 inches. Cutting and machining of the extrudate can also be performed manually or automatically with a similarly high degree of precision.

For a gearbox that uses a worm drive and pinion mechanism on the drive shaft, exemplary interior surfaces include an axially disposed channel for the drive shaft and lateral channels for bearing assemblies used with a handle shaft inserted transverse to the drive shaft. The width of the extruded channel should be sufficiently wide for a gear mechanism to be disposed between the lateral bearing assemblies and engage the drive section of the drive shaft. A helical groove in the drive shaft engages the spool through the drag system to allow the spool to cease its rotational motion if the applied line tension on the spool exceeds the drag setting. Other gear systems (e.g., a conventional face gear system) will involve other surfaces to support the drive gears in a modular, one piece gearbox shell that is not intended to be disassembled by anglers. In this way, the precision alignment of the gears is maintained for the life of the reel.

In general, it is preferred that bearing surfaces for the drive shaft be provided at either end of the gearbox shell. This provides spaced apart bearing support surfaces that offer a superior form of spaced drive shaft support compared to conventional spinning reel designs in which bearing surfaces are applied to one end, and the drive shaft extends therefrom without bearing support.

Once the gearbox shell is formed, the internal components of the drive mechanism are positioned. Such components include the drive shaft, bearing surfaces for the drive shaft, the drive gear and the bearing surfaces for the drive gear. The reel foot is then attached to the gearbox shell in a manner that fully encloses the internal components of the gearbox although a covered access port may be provided to allow the drive system to be lubricated. The bail arm/spool assembly including an adjustable drag system is attached to the axially protruding drive shaft.

The figures illustrate a preferred embodiment that uses a worm gear and pinion drive system. It will be understood that the figures are included to serve as an aid for understanding of the present invention and are not intended to serve as a limitation on the scope of the appended claims.

In the preferred embodiment of the figures, extruded gearbox shell stock 1 is formed in an extended length with a series of continuous external and continuous internal surface features that are sized and positioned to accept components of the gear mechanism. Shell stock 1 is cut to length to form gearbox shell 20.

Blank 1 is shaped and machined to include positions for attaching a reel foot assembly 13 as well as a bail arm/spool assembly 14. Suitable connections include countersunk bore holes 16 for screws that will secure reel foot 13 to shell 1. Such an external connection to a modular gearbox allows anglers the ability to replace a damaged reel foot without disassembling the critical gear mechanism or otherwise opening a housing for aligned moving parts. Such independence provides a spinning reel with a longer useful life and maintenance of drive gear alignment.

Opposing internal channels 2 and 3 are sized for ball bearing race assemblies 4 that are also centered vertically to support handle 5 inserted through transverse openings 6 that are machined into shell 20. Assemblies 4 also support worm drive gear 15 above and in mesh engagement with worm section 17 in the outer sleeve of drive shaft unit 11.

Openings 22 engage handle 5 inserted through either side for right or left-handed anglers. A threaded cap 12 can be used to close the opposite opening and retain the handle in the gearbox. Longitudinal bore 7 is dimensioned to allow shoulder 8 to be formed therein to a size sufficient to accept ball bearing assemblies 9 and 10 that will receive and support drive shaft unit 11. The ability to use a pair of ball bearing support assemblies for handle 5 and a separate pair for drive shaft unit 11 in a gearbox made with a high degree of precision along with a worm gear drive with a low surface friction provides a spinning reel with an exceptionally smooth gear action and a long useful life.

Assemblies 9 and 10 are located at the rear and forward ends of gearbox shell 20, respectively, thereby providing bearing surfaces for drive shaft unit 11 at either end of gearbox shell 20. As shown, bearing assembly 9 is located at a distance within about 1–15% of the length of shaft unit 11 from the terminal end thereof i.e., opposite the bail arm/spool assembly 14. Bearing assembly 10 is spaced apart from assembly 9 at a distance within about 25–50% the total length of drive shaft unit 11 as measured from its terminal end. The spacing of bearing assemblies 9 and 10 both provide additional support for shaft unit 11 and virtually eliminate bending deflection over the contact length of worm section 17. The result is a gear mechanism that maintains a smooth action and more fully provides mechanical support for the drive shaft.

Handle 5 is preferably secured by friction, adhesion, welding, threading or other structurally secure connection to a shaft with a cross sectional shape that is a simple geometric shape (triangle, rectangle, square, pentagon, hexagon, etc.) that will engage a correspondingly shaped central opening 23 in worm drive gear 15. Worm drive gear 15 may be made of virtually any material that can be threaded with worm gear ribs. Preferably, worm drive gear 15 is made of a metal that is not readily susceptible to corrosion and which has a fairly low frictional coefficient. Preferred materials for worm drive gear 15 include brass and similar materials.

Worm drive gear 15 associates with worm section 17 the outer sleeve of of drive shaft unit 11 to rotate shaft 11 and bail arm assembly 14 as handle 5 is turned. Pin 18 rides in helical groove 19 of shaft unit 11 to move spool 30 axially as handle 5 is turned. A suitable frictional drag system (not shown) allows the bail arm and spool assemblies to slip when the line tension on the spool exceeds a preset force. When drag washers (not shown) are positioned around drive shaft unit 11 and just ahead of helical groove 19 and below spool 30, washers of a relatively large diameter and surface area can be used. Such increased surface area provides a smooth drag that does not exhibit the intermittent stick/slip action of small diameter washers. Such a position also permits spool 30 to be changed without changing drag settings or unpacking the drag washer stack.

Drive shaft end cap 21 acts as a lubrication port that allows access to worm drive section 17 of drive shaft unit 11 without changing the alignment of the drive mechanism. This provides the reel with an extended useful life at the same precision feel.

Spool 30 is preferably a removable spool for holding fishing line although a spool can be made that remains fixed within the rotor assembly. A preferred spool is removable with a push button mechanism. The spools can be made of plastic, aluminum, aluminum alloys, or any workable metal that will hold adequate lengths of fishing line ready for use over extended periods of time without corrosion or damage to the line.

Reels according to the invention are based on a modular, self-contained drive gearbox with a protruding, supported drive shaft. Exposed wear parts like the reel foot and bail arm/spool assembly are attached to that drive gearbox and replaceable without adversely effecting the precision gearing.

Numerous characteristics, advantages and embodiments of the invention have been described in detail in the foregoing description with reference to the accompanying drawings. However, the disclosure is illustrative only and the invention is not limited to the illustrated embodiments. Various changes and modifications may be effected therein by one skilled in the art without departing from the scope or spirit of the invention.

We claim:

1. A spinning reel comprising:
   a gearbox comprising a one piece gearbox shell having a longitudinal bore sized to accept bearing assemblies therein, and bearing assemblies supporting a drive gear;
   a reel foot attached to said gearbox, and
   a drive shaft unit engaged with said drive gear.

2. A spinning reel according to claim 1 wherein said gearbox shell is made from a single piece of extruded channel stock with opposing internal channels sized for said bearing assemblies to support said drive gear therebetween and a transverse handle acting on said drive gear; and
   a longitudinal bore sized to accept bearing assemblies at rear and forward ends of said gearbox shell.

3. A spinning reel according to claim 1 wherein said gearbox shell is made from a metal, metal alloy, synthetic polymeric material, or a ceramic.

4. A spinning reel according to claim 1 wherein said gearbox shell is made from a metal.

5. A spinning reel according to claim 1 wherein said gearbox shell is made from aluminum.

6. A spinning reel according to claim 1 wherein said gearbox shell is made from a metal alloy.

7. A spinning reel according to claim 1 wherein said gearbox shell is made from a synthetic polymeric material.

8. A spinning reel according to claim 1 wherein said gearbox shell has been formed by injection molding, die casting, cold forging, hot forging, compression molding, extrusion, investment casting, sand casting, or slip casting.

9. A spinning reel according to claim 1 wherein said drive shaft unit includes a worm drive section in meshing communication with said drive gear, and a helical groove in communication with said spool.

10. A spinning reel according to claim 9 wherein said drive gear is made of brass.

11. A method of making a spinning reel according to claim 1 that comprises the steps of:
    forming a gearbox shell from a single piece of shell material with opposing channels sized for bearing assemblies, a longitudinal bore sized for a drive shaft unit and bearing assemblies, and a transverse opening for a handle;
    installing within said shell a drive gear in alignment with the transverse opening and supported at each opening by bearing assemblies in said opposing channels, and a drive shaft unit supported by bearing assemblies in tear and front ends of said longitudinal bore and extending therefrom;
    attaching a reel foot to said shell and a bail arm/spool assembly to said drive shaft unit.

12. A method according to claim 11 wherein the forming step comprises: injection molding, die casting, cold forging, hot forging, compression molding, extrusion, investment casting, sand casting, or slip casting.

13. A method according to claim 11 wherein the forming step comprises:
    cutting an extrudate blank from a length of extruded stock; and
    machining said blank into said gearbox shell.

14. A method according to claim 13 wherein said extruded stock is made of a metal, metal alloy, or synthetic polymeric material.

15. A method according to claim 13 wherein said extruded stock is made of a ceramic.

16. A method according to claim 11 wherein the forming step comprises:
    casting said gearbox shell in near net final shape; and
    machining said near net final shaped gearbox shell into said gearbox shell.

17. A spinning reel comprising:
    a spool for retaining fishing line,
    a bail arm assembly that guides line onto said spool,
    a drive shaft unit supported within a one piece gearbox shell by bearing assemblies at rear and forward ends of said gearbox shell, said drive shaft unit including a worm gear section and a helical groove wherein said spool is axially displaced as said shaft rotates through a pin guided in said groove and said bail arm assembly is rotated around said spool as said shaft rotates, and
    a worm gear rotatably driven by a handle and supported within a one piece gearbox shell along an axis transverse to said drive shaft, wherein said worm gear meshes with said worm gear section of said drive shaft unit to rotate said shaft as said handle is turned.

18. A spinning reel according to claim 17 wherein said worm gear is made of brass.

* * * * *